United States Patent
Jacobsohn et al.

(10) Patent No.: US 8,144,578 B2
(45) Date of Patent: Mar. 27, 2012

(54) COMMUNICATION NETWORK WITH LINE- AND PACKET-SWITCHING CONTROL

(75) Inventors: Dieter Jacobsohn, Bonn (DE); Karl-Heinz Nenner, Bornheim (DE); Sabine Demel, Vienna (AT)

(73) Assignee: T-Mobile International AG, Bonn (DE)

( * ) Notice: Subject to any disclaimer, the term of this patent is extended or adjusted under 35 U.S.C. 154(b) by 139 days.

(21) Appl. No.: 12/438,401

(22) PCT Filed: Aug. 22, 2007

(86) PCT No.: PCT/EP2007/007373
§ 371 (c)(1),
(2), (4) Date: Oct. 6, 2009

(87) PCT Pub. No.: WO2008/022775
PCT Pub. Date: Feb. 28, 2008

(65) Prior Publication Data
US 2011/0026515 A1    Feb. 3, 2011

(30) Foreign Application Priority Data
Aug. 23, 2006 (DE) .......................... 10 2006 039 430

(51) Int. Cl.
*G01R 31/08* (2006.01)
(52) U.S. Cl. ....................................... 370/229; 370/401
(58) Field of Classification Search .................. None
See application file for complete search history.

(56) References Cited

U.S. PATENT DOCUMENTS

| 7,355,988 | B1 * | 4/2008 | Denbar et al. ............... 370/282 |
| 7,613,290 | B2 * | 11/2009 | Williams et al. .......... 379/265.07 |
| 2007/0263599 | A1 * | 11/2007 | Itzkovitz et al. .............. 370/352 |
| 2007/0287466 | A1 * | 12/2007 | Hughes et al. ................ 455/450 |
| 2008/0080531 | A1 * | 4/2008 | Williams et al. .............. 370/401 |
| 2011/0026515 | A1 * | 2/2011 | Jacobsohn et al. ............ 370/352 |

FOREIGN PATENT DOCUMENTS

WO    96/38018 A1    11/1996

OTHER PUBLICATIONS

Lautenbacher et al., "Intelligent Internet: Value-Added Services by Interworking Between Network Technologies", XVI World Telecom Congress Proceedings (ISS 97), pp. 45-51, (1997) XP000704454.
Lakshmi-Ratan, R. A., "The Lucent Technologies Softswitch—Realizing the Promise of Convergence", Bell Labs Journal, pp. 174-195, (1999) XP000851517.

* cited by examiner

*Primary Examiner* — Robert Wilson
(74) *Attorney, Agent, or Firm* — Browdy and Neimark, PLLC

(57) ABSTRACT

A common communication network with line- and packet-switching control is provided, with telecommunication services such as call-forwarding, being carried out by means of a link between a control device and a communication network. At least partially synchronized control is provided for both the line-switching and the packet-switching part of the communication system, and carries out the telecommunication services.

3 Claims, 1 Drawing Sheet

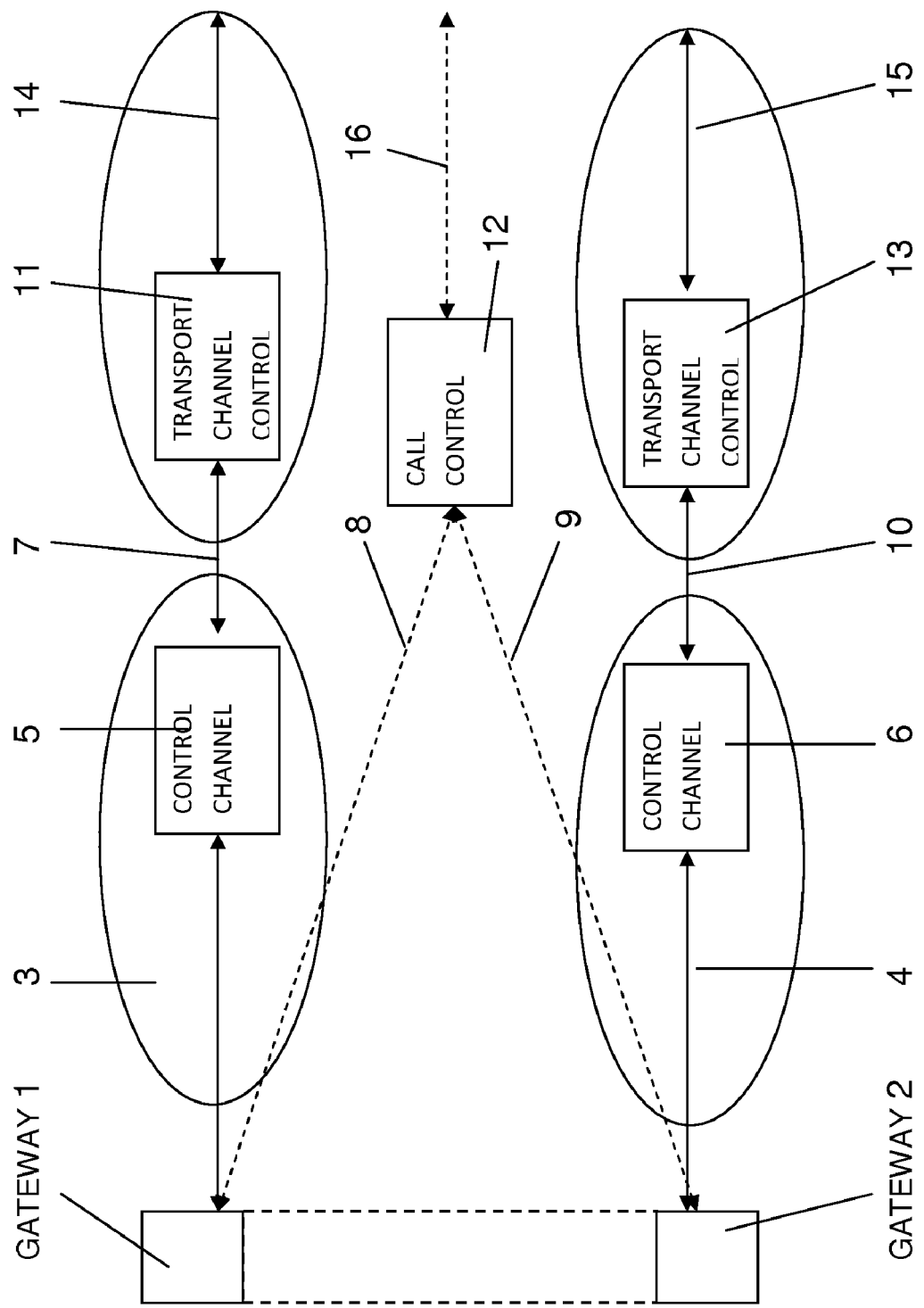

COMMUNICATION NETWORK WITH LINE- AND PACKET-SWITCHING CONTROL

FIELD

The invention relates to an alternative proposal for implementing telecommunication services in both line- and packet-switching telecommunication networks.

PRIOR ART

In telecommunication networks as they are known from the prior art, in which the focus lies on telephone services, such as, for example, voice telephony and the associated value-added services, such as, for example, call forwarding, so-called line-switched channels are used for transmitting the traffic channels (e.g. voice.)

Additionally, telecommunication networks of this type use special protocols based on CCITT Signaling System #7 (SS7) for controlling the set-up and teardown of these traffic channels, wherein SS7 is a further development of SS5 and SS6, in which the signaling was carried out by means of certain tones between the switching centers.

This CCITT Signaling System #7 (SS7) is currently the most widely used signaling system in national and international telecommunication networks, and as a result of this popularity, various protocols of the SS7 stack are currently also being specified, developed and utilized for SS7OIP applications.

Building upon this are value-added services that utilize an additional logic in the switching node or in external nodes of a so-called "Intelligent Network" (IN).

Traffic channels of a line-switching network have the characteristic that the bandwidth that is established during initiation of the connection is generally reserved for the duration of the connection along the path between the caller and the called party.

The following distinction is made with respect to the signaling used for controlling of connections:

Signaling between the user devices and network endpoint node (UNI); and
Signaling within the network, i.e. between network-internal nodes (NNI).

ISDN networks thus, for example, use the EDSS-1 protocol and mobile radio networks based on GSM standard use DTAP for UNI.

For signaling between network-internal nodes within the network, both subnetworks use ISUP and other protocols from SS7. In all of the aforementioned cases dedicated transmission channels are available for the signaling, which are managed separately from the traffic channels (e.g. voice.)

The originally designed data services in line-switching networks have been replaced almost entirely with packet-switching networks under utilization of Internet-like technologies.

These networks do not set up firmly reserved channels between the communication partners; instead they use a predominantly wide-band connection by means of the known statistical multiplexing method jointly with other data streams, wherein the multiplexing method uses methods for signal and message transmission in which multiple signals are grouped together and transmitted simultaneously via a medium, such as, for example, a line, a cable, or a radio path.

If a network of this type is to be used for telephone services, the signaling that is required for this does not take place on a network level but on an application level, analogous to the paradigm of the Internet.

For this reason there are also no dedicated signaling channels; instead the signaling takes place via the same channels as the transmission of the user data (application level.)

In the simplest case, the signaling takes place between the participating user devices.

However, communication of the user devices with an application server connected between them for implementation of additional network control and/or value-added services or the like, is possible as well.

No distinction is made, however, between UNI and NNI.

The solutions that are currently in place customarily use the "Session Initiation Protocol" SIP. Irrespective of the transmission technology, there are advantages and disadvantages to using the line-switching and packet-switching telecommunication (sub)networks.

Separate controls for these line-switching and packet-switching telecommunication (sub)networks are known already from the prior art.

Within the general trend toward the Internet, it now also appears practical for operators of "traditional" telecommunication networks to carry out a portion of their telecommunication services via packet-switching networks and use the associated controls also for the line-switching part of the communication network.

The fundamental advantage is a coordinated, synchronized use of both line-switching and packet-switching parts of communications systems.

However, this leads to the following crucial disadvantages:

The network operator must establish a completely new protocol world, based on SIP, in order to continue to provide its known telephone services.

Accordingly, all value-added services must be implemented anew on SIP basis at significant expenditure, with the aid of special application servers. This is true both for services that are currently based on integrated logic in the switching nodes, and for IN-based services.

The respective control device must include both line-switching and packet-switching functions, which are very different in terms of their requirements.

With the publication Lautenbacher M E ET AL "Intelligent Internet: Value-Added Services By Interworking Between Network Technologies" XVI World Telecom Contress Proceedings (ISS'97) a communication network with line-switching and packet-switching control is disclosed, wherein telecommunication services are performed by linking a control device to a communication network, and at least partially shared synchronized control is provided for both the line-switching and the packet-switching part of the communication system and carries out the telecommunication services.

It cannot be gathered from this publication that an unchanged operation of identical services in both the packet-switching and the line-switching communication network is possible for the user. With the publication LAKSHMI-RATAN R A: "The Lucent Technologies Softswitch—Realizing The Promise Of Convergence" Bell Labs Technical Journal, Wiley, Calif., US—Vol. 4, No. 2 Apr. 1999 (1999-04)-June 1999 (1999-06), a PROGRAMMABLE voice processing system of PSTN/IP protocols for known operating systems is disclosed, which controls external network node points, access interfaces and RAS (remote access servers) and carries out Internet services via an open and flexible directional interface, and makes available open registration program interfaces for creating advanced services, wherein execution properties are programmable by service providers, and which has an expanded, server-based process management. From this publication it likewise cannot be gathered that an unchanged carrying-out of identical services is possible for the user in both the packet-switching and the line-switching communication subnetworks.

With printed publication WO 96/38018A, a method and system for setting up a speech connection between two user devices in an Intelligent Network and data network is disclosed, wherein a message of the first user device includes a data network address of the second user device and transmits the same via a gateway into the network, to update address data of the user of the first user device, and wherein the intelligent network controls the connection initiation between the users. It cannot be gathered from this printed publication that identical services are performed in both the packet-switching and the line-switching communication subnetworks for the user.

For the above reasons, it appears necessary to improve a control that is known from the prior art in such a way that a synchronized control can be used for both the line-switching and the packet-switching part of the communication system.

SUMMARY

It is the object of the present invention to keep the technical work and financial expenditures that are required for converting the communication network relatively low.

This object is met according to the invention with the technical teaching of the independent claim, which recites a communication network with line-switching and packet-switching control, with telecommunication services, such as call forwarding, being carried out by linking a control device to a communication network, with at least partially synchronized control provided for use with both the line-switching and the packet-switching part a communication system that carry out telecommunication services, wherein the synchronized control carries out identical services in both the packet-switching and the line-switching part of the communication network, unchanged for the user.

In contrast to the known methods, in which separate control devices are used for the line-switching and the packet-switching parts of the communication system, a common control device is used here.

The advantage of carrying out telecommunication services in this manner is that, by combining line-switching and packet-switching parts of communication networks, a significantly higher efficiency of the individual parts is achieved.

Accordingly, it is provided and possible to use a use-dependent control within a communication network of this type.

The inventive embodiment of such a linking to a communication network thus creates fundamental advantages for the user.

For example, identical services are performed unchanged for the user in both the packet-switching and the line-switching communication subnetworks.

For example, call forwarding is set up and treated identically in each case.

It is an added benefit that the communication network operator is able to offer services in a completely transport network independent manner.

Moreover, the communication network operator is able to continue to offer all of the existing services.

Additionally, any desired services combination between line-switching and packet-switching services is possible.

BRIEF DESCRIPTION OF THE DRAWINGS

The invention will be explained in more detail below, based on a drawing depicting one possible form of implementation.

Additional characteristics that are essential to the invention and advantages of the invention will become apparent from the drawing and description thereof, wherein FIG. 1 shows a basic linking of a control device to a communication network.

DETAILED DESCRIPTION

The diagram shown in FIG. 1 provides a general overview of an inventive embodiment of a use-dependent call control 12, which forms a cumulation between the communication phases of the packet-switching communication network of a user-device gateway 1 with a line-switching communication network of a user-device gateway 2.

The call control 12 thus enables, for example, a text or image to be sent over the Internet simultaneously with a transmission of speech in a telecommunication network. This requires the aforementioned cumulation between the two communication phases, which is carried out by means of a suitable call control.

The subject matter of the present invention is attained not only from the subjects of the individual claims, but also from the combination of the individual claims with one another.

All of the specifications and characteristics disclosed herein, and in particular the three-dimensional embodiment shown in the drawing, are claimed as essential to the invention, to the extent that they are novel either individually or in combination over the prior art.

LIST OF REFERENCE NUMERALS

1. User-device gateway 1
2. User-device gateway 2
3. Access network 1
4. Access network 2
5. Transport channel control
6. Transport channel control
7. Data
8. UNI 1
9. UNI 2
10. Data
11. Transport-channel control
12. Call control 1
13. Transport-channel control
14. Connection network 1
15. Connection network 2
16. NNI 1

LEGEND

SS7 Signaling system according to CCIT (Comité Consultatif International Télégraphique et Téléphonique)
ISDN integrated services digital network
EDSS-1 digital subscriber signaling system No. 1 according to Euro-ISDN
UNI user network interface
NNI network node interface
GSM global system mobile
ISUP ISDN user part
Multiplexing Method for signal and message transmission, in which multiple signals are grouped together and transmitted simultaneously over a medium (line, cable, radio path)
SIP session initiation protocol (SIP protocol)

What is claimed is:
1. A communication network comprising:
a line switching part and a packet switching part, and a control device, wherein the control device is coupled to both the line switching part and the packet switching part, and wherein said control device configured to:
synchronize a first service on the line-switching part with a second service on the packet-switching part, wherein the first service and the second service are identical and transparent to a user, and wherein the identical services are performed unchanged for the user in both the line switching part and the packet switching part and offered to the user independently from whether which of the line switching part or the packet switching part is used, wherein said first service and said second service comprise at least one of transmission of voice, text and/or images between line-switching and packet-switching parts.

2. A method for operating a communication network, the network comprising a line switching part and a packet switching part and a control device coupled to both the line switching part and the packet switching part, the method comprising synchronizing a first service on the line-switching part with a second service on the packet-switching part,
wherein the first service and the second service are identical and transparent to a user, and
performing identical services for the user in both the line switching part and the packet switching part and offering the identical services to the user independently from which of the line switching part or the packet switching part is used,
wherein said first service and said second service comprise transmitting at least one of voice, text and/or images between line-switching and packet-switching parts.

3. The method for operating a communication network as defined in claim 1, wherein said first service and said second service is call forwarding.

* * * * *